3,275,407
METHOD OF RECOVERY OF AMMONIA AND SULFUR DIOXIDE
Herbert Furkert, Junkersdorf, near Cologne, and Rosina Schertz, Cologne-Lindenthal, Germany, assignors to Chemiebau Dr. A. Zieren G.m.b.H., Cologne-Braunsfeld, Germany, a corporation of Germany
No Drawing. Filed Aug. 28, 1962, Ser. No. 220,083
Claims priority, application Germany, Aug. 30, 1961, C 24,970/61
4 Claims. (Cl. 23—178)

The present invention relates to a method of recovery of ammonia and sulfur dioxide from ammonium sulfate, ammonium hydrogen sulfate and from aqueous acidic solutions containing ammonium sulfate and ammonium hydrogen sulfate, sulfuric acid and optionally organic compounds.

It is known that ammonium sulfate splits into ammonium hydrogen sulfate and ammonia upon heating to between 100° C. and 300° C.

It is also known that upon heating ammonium sulfate with coke or charcoal without access of air to temperatures of about 300° C. up to 400° C., mixtures of $NH_3$, $SO_2$, $H_2O$ and $CO_2$ may be recovered. This gaseous mixture can be separated by absorption of $SO_2$ and $CO_2$ in an aqueous paste of an alkali earth hydroxide or of magnesium oxide at boiling temperature. The paste containing the absorbed gases is dried and the $SO_2$ and $CO_2$ are recovered by heating in which the magnesium oxide and/or the alkaline earth or hydroxide oxide are reformed. After absorption of $SO_2$ and $CO_2$ from the original mixture, the $NH_3$ is obtained and is ready for any suitable use after condensation of the steam. An alternate separation of the gases involves the separation of ammonia by passage through a hot ammonium hydrogen sulfate solution. The hot ammonium hydrogen sulfate is transformed into ammonia and ammonium sulfate by reaction with the absorbed ammonia. The $SO_2$ and $CO_2$ pass through. $SO_2$ can be converted, for example into sulfuric acid, in a reaction in which the $CO_2$ does not interfere. The ammonium sulfate precipitates as a solid. It may be split in the manner described hereinbefore to recover free, pure $NH_3$ and ammonium hydrogen sulfate, which may be recycled for the further separation of ammonia.

This known working method assumes that the solutions are evaporated, in order to obtain, at first, solid ammonium sulfate. The coals and cokes must be finely ground and intimately admixed with the ammonium sulfate. The mixture is then indirectly heated either in charges in retorts or continuously in rotary furnaces. It is difficult to prevent the access of air or the loss of gaseous reaction products during filling of the retort or feeding of the material into the rotary furnace.

The method according to the present invention does not start, however, with solid ammonium sulfate, rather with solutions which contain ammonium sulfate or ammonium hydrogen sulfate and under circumstances also sulfuric acid. It can start also with molten acidic ammonium sulfate. These solutions are now not admixed with coal and coke powder, they are sprayed in a chamber, which is filled completely or partly with cokes or coal. In this chamber takes place successively or simultaneously the vaporization of water, the splitting off of ammonia and on cokes the reduction of the acidic ammonium sulfate and of the sulfuric acid to sulfur dioxide, carbon dioxide, water vapor and ammonia.

It is also known to decompose waste sulfuric acid which contains organic material, by vaporizing into a chamber, in which a temperature range of 800° C. to 1000° C. is maintained by burning of coke gases, generator gases or oil in air. In this operation, gas mixtures of 10% to 12% $SO_2$, $CO_2$ and excess oxygen, nitrogen and steam are formed. These gases can be reformed, after cooling, purifying and drying in the conventional manner into concentrated sulfuric acid. Waste sulfuric acid which contains ammonium salts, when treated by this method, results in a split gas, which does not contain ammonia but which decomposes at the aforementioned temperatures and is oxidized to steam, nitrogen and some nitrous oxide. In this case, the nitrous oxide containing sulfuric acid has only limited uses. The methods of removing the nitrogen from concentrated sulfuric acid are expensive and from an industrial viewpoint, untenable.

Waste sulfuric acid containing ammonium salts is often neutralized with ammonia to recover ammonium sulfate. The final product, however, is not of satisfactory purity. Furthermore, ammonium sulfate is an inherent by-product of many industries. For this reason, the use of ammonia for the recovery of ammonium sulfate cannot be considered economical, particularly if the product does not meet the requisite purity standards.

It is one object of the present invention to provide a process for recovering ammonia and sulfur in the form of sulfur dioxide from aqueous sulfuric acid solutions containing ammonium sulfate and ammonium hydrogen sulfate.

It is a further object of the present invention to provide a process for decomposing ammonium hydrogen sulfate and recovering ammonia and sulfur in the form of sulfur dioxide.

I discovered that when (1) molten ammonium hydrogen sulfate, or (2) an aqueous acid solution containing ammonium hydrogen sulfate and usually ammonium sulfate, or (3) a waste acid solution containing said salts, is introduced into a reaction chamber which is partially or completely filled with coke at a temperature between 370° C. to 470° C., ammonia and sulfur dioxide are formed. $NH_3$ is split off from $(NH_4)_2SO_4$ and $NH_4HSO_4$, water is evaporated, and $H_2SO_4$ is reduced to $SO_2$. The reduction occurs on the coke or with the assistance of the organic waste products which are often found when waste sulfuric acid solutions are treated. $NH_3$, $H_2O$ and $SO_2$ escape with the $CO_2$ formed during the process. $NH_4HSO_4$ boils at a temperature of 490° C. However, in this process, reduction takes place in the reaction chamber in the gas phase on the surface of the coke. The presence of steam, the split-off $NH_3$, as well as the formed $SO_2$ and $CO_2$ reduce the partial pressure of $NH_4HSO_4$ so that it is completely evaporated.

At temperatures below 370° C., the yield of $NH_3$ and $SO_2$ is reduced. Above a temperature of 390° C., the $SO_2$ yield increases, however, the $NH_3$ yield decreases. With pure ammonium sulfate and coke at a temperature of 380° C., yields of 94.5% of $NH_3$ and 84.0% of $SO_2$ have been measured. The maximum $NH_3$ yields are based on the fact, that the speed of reduction of the hexavalent sulfur, as well as the speed of decomposition of ammonia, both increase with higher temperatures.

To maintain the aforementioned narrow temperature limits, gas or oil cannot be burned directly in the reaction chamber, as is done in the furnaces for treating waste sulfuric acid. The resultant high flame temperature would destroy a great portion of the ammonia. For this reason, coke oven gas, generator gas, natural gas or fuel oil used for heating are burned in a separate burner. The burner gases are freed from oxygen by passing through a layer of red hot coke and then fed into the reaction chamber where the molten salt is evaporated and/or decomposed. The gases entering the reaction chamber for heating purposes are a mixture of carbon monoxide, carbon dioxide and nitrogen and water vapor.

The usual waste acids containing the ammonium salts available are those containing ammonium sulfate and ammonium hydrogen sulfate. Occasionally other sulfur-containing ammonium salts will be present. These waste acids also often contain some organic material. However, the content of organic material is usually insufficient for the reduction of all the hexavalent sulfur to $SO_2$, particularly since an excess of the reductant must be present. Consequently the coke present in the reaction chamber is used up during the process. This coke can be replaced by charging intermittently, or may be continuously introduced into the chamber through a feed device through an air-lock. In addition to coke, other carbon containing material is suitable as the reduction agent, for example charcoal. The coke is disposed in a layer so that the gas mixture has sufficient reaction time. Surprisingly, waste gases which contain sulfonates and other organic substances in smaller amounts than are required for the reduction herein, do not form solid carbon-containing by-products which could interfere with the gas flow.

The mixture of gaseous products of the instant process may be separated by various means. In a preferred process, ammonia is absorbed by an ammonium hydrogen sulfate solution in a saturation device for ammonium sulfates of the type used in coke gas purification. Ammonium sulfate is formed and precipitated, recovered and dried and then heated continuously in so-called "bisulfate retorts" to obtain pure ammonia, and molten ammonium hydrogen sulfate which flows off. The molten ammonium hydrogen sulfate may be dissolved and the solution recycled to the saturation device. The remaining gas mixture, which contains $SO_2$, $CO_2$, $N_2$ and steam, passes through the saturation device. It is then cooled and usually washed with water to remove fumes, and then dried by sulfuric acid, and catalytically worked up to 98% sulfuric acid and sometimes oleum.

Magnesium oxide is preferred to the alkali oxides or hydroxides for the separation of ammonium by absorbing $SO_2$ and $CO_2$ because $MgSO_3$ and $MgCO_3$ can be decomposed at much lower temperatures to $MgO$ and $SO_2$ and $CO_2$, than can the corresponding salts of the alkaline earths. However, $NH_4HSO_4$ is preferred over $MgO$ for the separation of $SO_2$ and $CO_2$ from $NH_3$ because the formation of $NH_3$ from the decomposition of $(NH_4)_2SO_4$ occurs at lower temperatures and with less energy, than does the decomposition of $MgSO_3$ and $MgCO_3$.

It is an essential characteristic of the present process, that the gas in the reaction chamber does not contain any oxygen.

The process can also be performed by heating the reaction chamber from the outside by any conventional means, however, the heating temperature is, preferably, held within narrow limits, namely between 370° C. and 400° C.

It is to be understood that any known heating means can be used, which are capable of maintaining the temperature within the mentioned range and also the reaction chamber free from oxygen.

During the process the hexavalent sulfur is reduced to quadrivalent sulfur, which can occur, however, only in the absence of oxygen. If the gases used for the heating of the reaction chamber contain some oxygen, it must be removed. It is for this reason that it is fed over hot coke, before entering the reaction chamber. Carbon monoxide and carbon dioxide do not disturb the process and the final product.

The following illustrative example further illustrates the process to those skilled in the art:

From a waste sulfuric acid solution of the composition

| | Percent |
|---|---|
| $H_2SO_4$ | 19 |
| $NH_4HSO_4$ | 37 |
| $C_3H_{12}O_7N_2$ | 12 |
| $H_2O$ | 27 |
| Other organic material | 5 | about 100 kg. of the waste sulfuric acid solution was decomposed during about one hour in a reaction chamber, the temperature of which was maintained at a range of between 380° C. and 390° C. A charge of about 600 kg. of coke was in the reaction chamber. As heating means served the burning gas of 4 m.³ of gas per hour of the following composition:

| | Percent by volume |
|---|---|
| $CH_4$ | 66 |
| $H_2$ | 32 |
| $C_2H_4$ | 1 |
| $N_2$ | 1 |

The burning gas had the following composition after passing the chamber containing hot coke:

| | Percent by volume |
|---|---|
| $H_2O$ | 22.6 |
| $CO_2$ | 8.1 |
| $CO$ | 0.5 |
| $N_2$ | 68.8 |

The gas discharged from the reaction chamber had the following composition:

| | Percent by volume |
|---|---|
| $SO_2$ | 11.2 |
| $NH_3$ | 7.6 |
| $H_2O$ | 52.6 |
| $CO_2$ | 11.6 |
| $N_2$ | 16.9 |

The exploitation was 93.4% calculated in connection with $NH_3$ and 92.2% calculated in connection with $SO_2$.

The gas was freed from $NH_3$ by washing with ammonium hydrogen sulfate solution. The pure ammonium sulfate obtained thereby was thermally split into ammonium hydrogen sulfate and pure $NH_3$. The washed gas contained in addition to $N_2$, $CO_2$, $CO$ and $H_2O$ only $SO_2$.

The process was also carried out utilizing molten ammonia hydrogen sulfate as the feed material in place of the waste sulfuric acid solution. Similar good yields of ammonia and sulfur dioxide were obtained.

While we have disclosed several embodiments of the present invention, it is to be understood that these embodiments are given by example only and not in a limiting sense, the scope of the present invention being determined by the objects and the claims.

We claim:

1. A process for recovering ammonia and sulfur in the form of sulfur dioxide from an ammonium hydrogen sulfate containing feed material selected from the group consisting of ammonium hydrogen sulfate and aqueous sulfuric acid solutions containing ammonium hydrogen sulfate and ammonium sulfate, comprising the steps of introducing the feed ammonium hydrogen sulfate containing material into an airtight reaction chamber containing a carbon reducing agent selected from the group consisting of coke and charcoal and at a temperature range of between 370° C. and 470° C. to form ammonia, and sulfur dioxide, and withdrawing said gases from said reaction chamber.

2. The process, as set forth in claim 1, wherein said sulfuric acid solution is a waste sulfuric acid solution.

3. A process for recovering of ammonia and sulfur in the form of sulfur dioxide from aqueous sulfuric acid solutions containing ammonium hydrogen sulfate and ammonium sulfate, comprising the steps of
  burning a gas selected from the group consisting of coke oven gas, generator gas and natural gas with air,
  treating said gas emerging from said burning step by passage through red hot coke,
  feeding said gas emerging from said burning step in an airtight reaction chamber, containing a material selected from the group consisting of coke and charcoal,
  feeding said aqueous sulfuric acid solution into said reaction chamber,
  maintaining said reaction chamber at a temperature range of between 370° C. and 400° C., and
  withdrawing from said reaction chamber ammonia, sulfur dioxide, carbon dioxide and water vapor.

4. The process, as set forth in claim 3, wherein ammonia is separated from said gases withdrawn from said reaction chamber by passing said gases through an ammonium hydrogen sulfate solution which absorbs the ammonia and does not absorb the remaining gaseous components.

References Cited by the Examiner

UNITED STATES PATENTS

| | | | |
|---|---|---|---|
| 2,926,070 | 2/1960 | Milliken | 23—177 X |
| 2,927,001 | 3/1960 | McCollough | 23—177 X |

OSCAR R. VERTIZ, *Primary Examiner.*

MAURICE A. BRINDISI, *Examiner.*

E. J. MEROS, A. GREIF, *Assistant Examiners.*